United States Patent
Qiu

(10) Patent No.: US 10,371,974 B2
(45) Date of Patent: Aug. 6, 2019

(54) BAR-TYPE DISPLAY SCREEN AND SPLICING BACKPLANE THEREOF

(71) Applicant: Shenzhen China Star Optoelectronics Technology Co., Ltd., Shenzhen, Guangdong (CN)

(72) Inventor: Yongyuan Qiu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 299 days.

(21) Appl. No.: 15/323,821

(22) PCT Filed: Oct. 12, 2016

(86) PCT No.: PCT/CN2016/101890
§ 371 (c)(1),
(2) Date: Jan. 4, 2017

(87) PCT Pub. No.: WO2018/028044
PCT Pub. Date: Feb. 15, 2018

(65) Prior Publication Data
US 2018/0180927 A1    Jun. 28, 2018

(30) Foreign Application Priority Data
Aug. 10, 2016  (CN) .......................... 2016 1 0654786

(51) Int. Cl.
*G02F 1/1333* (2006.01)
*G02F 1/1335* (2006.01)
(52) U.S. Cl.
CPC .. *G02F 1/133308* (2013.01); *G02F 1/133608* (2013.01); *G02F 2001/13332* (2013.01);
(Continued)

(58) Field of Classification Search
CPC ............. G02F 1/133308; G02F 1/1333; G02F 1/1335; G02F 1/1336; G02F 1/133603;
(Continued)

(56) References Cited

U.S. PATENT DOCUMENTS

| 9,417,494 B2 * | 8/2016 | Kim .................... G02F 1/13452 |
| 2014/0139780 A1 * | 5/2014 | Wang ................ G02F 1/133608 |
| | | 349/58 |

FOREIGN PATENT DOCUMENTS

| CN | 102401352 | 4/2012 |
| CN | 102661556 | 9/2012 |

(Continued)

OTHER PUBLICATIONS

International Search Report and Written Opinion for International Application No. PCT/CN2016/101890, dated May 19, 2017.
(Continued)

*Primary Examiner* — Thoi V Duong

(57) ABSTRACT

The present disclosure relates to the technical field of display and discloses a bar-type display screen and a splicing backplane thereof, so as to solve a technical problem of high production costs in the prior art. The splicing backplane of the bar-type display screen includes a bottom frame and a top frame that are spliced together. The bottom frame and the top frame are fastened and connected using a connecting piece. A groove configured to place a light bar is disposed on the bottom frame. The bar-type display screen includes a liquid crystal panel and the splicing backplane. The present disclosure may be applied to bar-type display screens in various sizes.

20 Claims, 2 Drawing Sheets

(52) U.S. Cl.
CPC ............ *G02F 2001/133314* (2013.01); *G02F 2001/133328* (2013.01); *G02F 2001/133607* (2013.01); *G02F 2201/46* (2013.01)

(58) Field of Classification Search
CPC ......... G02F 1/133602; G02F 1/133607; G02F 1/133608; G02F 2001/133314; G02F 2001/133317; G02F 2001/13332; G02F 2001/133328; G02F 2201/46; G02F 2001/133607

See application file for complete search history.

(56) References Cited

FOREIGN PATENT DOCUMENTS

| | | |
|---|---|---|
| CN | 102691939 | 9/2012 |
| CN | 103543559 | 1/2014 |
| CN | 104141911 | 11/2014 |
| CN | 105044964 | 11/2015 |
| JP | 2012124053 | 6/2012 |

OTHER PUBLICATIONS

Chinese Office Action and Search Report for Chinese Patent Application No. 201610654786.8 dated Jun. 16, 2017.

\* cited by examiner

BAR-TYPE DISPLAY SCREEN AND SPLICING BACKPLANE THEREOF

CROSS-REFERENCE TO RELATED APPLICATIONS

The present application claims the priority of Chinese patent application CN 201610654786.8, entitled "Bar-type display screen and splicing backplane thereof" and filed on Aug. 10, 2016, the entirety of which is incorporated herein by reference.

FIELD OF THE INVENTION

The present disclosure relates to the technical field of display, and in particular, to a bar-type display screen and a splicing backplane thereof.

BACKGROUND OF THE INVENTION

With the development of display technologies, liquid crystal display screens have become the most common display devices. The liquid crystal display screens have superb features such as high space utilization, low power consumption, no radiation, and low electromagnetic interference, and therefore are widely applied to information communication tools such as televisions, mobile phones, and tablet computers.

In another aspect, as the application field of liquid crystal display devices further enlarges, we often see, in our lives, display screens that are greatly different from those display screens with a common display ratio (16:9). Such display screens are generally of a bar type, and therefore are referred to as bar-type display screens. The bar-type display screens are often applied to some public places and configured as functional display screens such as signposts, shopping guides, and information bulletins.

At present, in production, the bar-type display screens are mainly obtained by cutting liquid crystal display screens with a common size ratio. As shown in FIG. 1, a common liquid crystal display screen 10 is cut at half width thereof or one-fourth width thereof, and two bar-type screens 20 and 30 that have different length-to-width ratios are thus obtained for application in appropriate scenarios.

A liquid crystal display screen includes a liquid crystal panel and a backplane. A liquid crystal panel of a bar-type display screen can be conveniently produced and manufactured by using the foregoing method. However, a backplane has a function of providing a bezel for the liquid crystal panel, and therefore a backplane suitable for the bar-type display screen cannot be manufactured simply by means of cutting. Therefore, backplanes of bar-type display screens in different sizes need to be designed and manufactured independently, thereby causing a technical problem that production costs of the bar-type display screens are relatively high.

SUMMARY OF THE INVENTION

The present disclosure aims to provide a bar-type display screen and a splicing backplane thereof, so as to conveniently produce and manufacture bar-type display screens and solve a technical problem of high production costs in the prior art.

The present disclosure provides a splicing backplane of a bar-type display screen. The splicing backplane includes a bottom frame and a top frame that are spliced together. The bottom frame and the top frame are fastened and connected using a connecting piece.

A groove configured to place a light bar is disposed on the bottom frame.

Preferably, the bottom frame and the top frame are fastened to the connecting piece using screws.

Further, a supporting wall is disposed at the bottom of the bottom frame.

Further, a supporting wall is disposed on the top of the top frame.

Further, the splicing backplane further includes one or more independent blocks that are disposed between the bottom frame and the top frame. A groove configured to place a light bar is disposed on the independent block.

Preferably, the independent block is fastened and connected to the bottom frame and the top frame using the connecting piece.

Preferably, the independent block is fastened to the connecting piece using screws.

Preferably, the connecting piece is of a bar type, a broken-line type, or an arc type.

The present disclosure further provides a bar-type display screen, which includes a liquid crystal panel and the foregoing splicing backplane.

Further, the liquid crystal panel is fastened to the bottom frame and the top frame.

The present disclosure brings the following beneficial effects. According to the present disclosure, the splicing backplane of the bar-type display screen is obtained by splicing the bottom frame and the top frame. In addition, the bottom frame and the top frame are fastened and connected using the connecting piece. The groove disposed on the bottom frame may be configured to place the light bar, to provide a backlight source for the bar-type display screen. By using the technical solutions provided in the present disclosure, the backplane of the bar-type display screen can be spliced and assembled, so as to adapt to bar-type display screens in different sizes. If a width of the bar-type display screen is relatively large, an appropriate quantity of independent blocks may be additionally disposed between the bottom frame and the top frame, to form a backplane in an appropriate size, which renders it unnecessary to independently design a corresponding backplane for a bar-type screen in a particular size, thereby reducing production costs of the bar-type display screen and solving the technical problem of high production costs in the prior art.

Other features and advantages of the present disclosure will be further explained in the following description, and will partly become self-evident therefrom, or be understood through implementation of the present disclosure. The objectives and advantages of the present disclosure will be achieved through the structure specifically pointed out in the description, claims, and the accompanying drawings.

BRIEF DESCRIPTION OF THE DRAWINGS

To describe the technical solutions in the embodiments of the present disclosure more clearly, the following briefly introduces the accompanying drawings required for describing the embodiments. In the drawings.

DETAILED DESCRIPTION OF THE EMBODIMENTS

The following describes the implementation manners of the present disclosure in detail in conjunction with the accompanying drawings and embodiments, so that one can fully understand the implementation process in the present disclosure of solving a technical problem using technical means and achieving technical effects, thereby implementing the present disclosure. It should be noted that, as long as there is no conflict, the embodiments of the present disclosure as well as the respective features in the embodiments may be combined with one another, and the formed technical solutions fall within the protection scope of the present disclosure.

The embodiments of the present disclosure provide a splicing backplane of a bar-type display screen, and a bar-type display screen using the splicing backplane. The backplane of the bar-type display screen can be assembled by means of splicing, so as to reduce production costs of the bar-type display screen.

Embodiment 1

Figure 1:
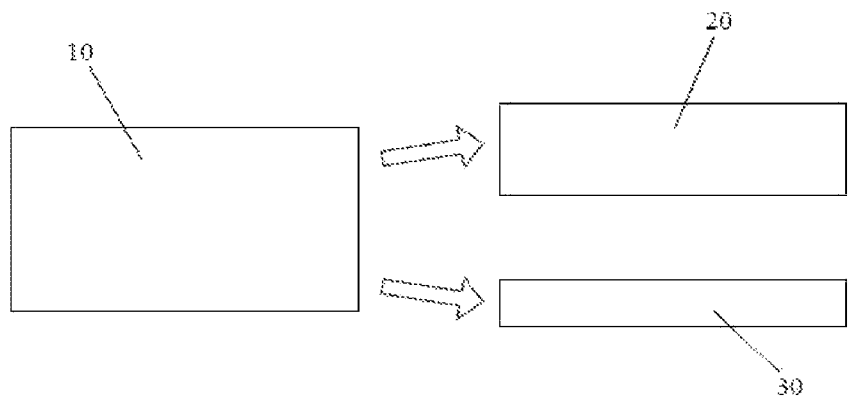
FIG. 1 schematically shows a manufacturing method of a bar-type display screen in the prior art.
Figure 2:
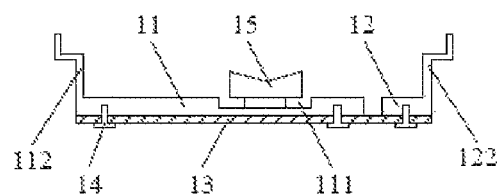
FIG. 2 schematically shows a cross-section view of a splicing backplane of a bar-type display screen according to Embodiment 1 of the present disclosure.
Figure 3:
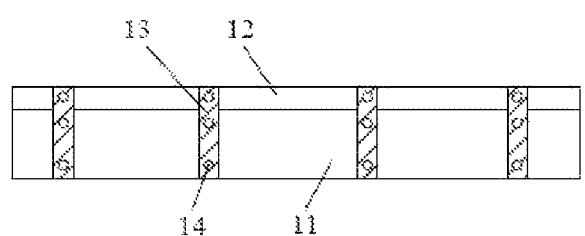
FIG. 3 schematically shows a plan view of the splicing backplane of the bar-type display screen according to Embodiment 1 of the present disclosure.

As shown in FIG. 2 and FIG. 3, a splicing backplane provided in an embodiment of the present disclosure includes a bottom frame 11 and a top frame 12 that are spliced together. In addition, the bottom frame 11 and the top frame 12 are fastened and connected using a connecting piece 13. In this embodiment, the bottom frame 11 and the top frame 12 are fastened to the connecting piece 13 using a screw 14, to ensure stability between the bottom frame 11, the top frame 12, and the connecting piece 13.

In addition, a groove 111 is disposed on the bottom frame 11. The groove 111 may be configured to place a light bar 15, so as to provide a backlight source for a bar-type display screen. That is, the bottom frame 11 serves as a body part of the backplane and provides the backlight source. The top frame 12 has a relatively small size and is spliced with the bottom frame 11 only as a bezel of the backplane, to form the complete backplane. Quantity of the bottom frame 11 and the groove 111 that is on an independent block may also be increased according to a specific light source requirement.

Further, a supporting wall 112 is disposed at the bottom of the bottom frame 11, and a supporting wall 122 is disposed on the top of the top frame 12. The supporting walls 112 and 122 disposed on the bottom frame 11 and the top frame 12 are configured as supporting walls on top and bottom sides of the whole backplane. The supporting walls 112 and 122 can protect the light bar inside the backplane and may also be configured to fasten and install a liquid crystal panel.

Figure 4:
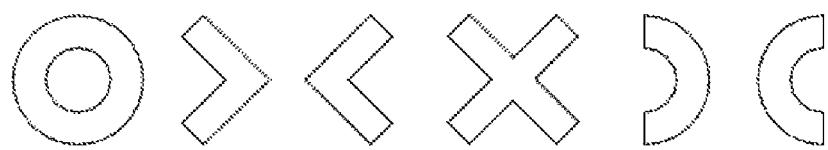
FIG. 4 schematically shows different implementation manners of a connecting piece according to an embodiment of the present disclosure.

It can be seen from FIG. 2 and FIG. 3 that, the connecting piece 13 in this embodiment is of a bar type. In addition, in another embodiment, the connecting piece 13 may also be of a broken-line type, an arc type, or other types, as shown in FIG. 4.

According to this embodiment of the present disclosure, the splicing backplane of the bar-type display screen is obtained by splicing the bottom frame 11 and the top frame 12. In addition, the bottom frame 11 and the top frame 12 are fastened and connected using the connecting piece 13. The groove 111 disposed on the bottom frame 11 may be configured to place the light bar 15, to provide the backlight source for the bar-type display screen. Therefore, for a bar-type display screen with a relatively small width, a backplane thereof may be obtained by splicing and assembling the bottom frame 11 and the top frame 12 in this embodiment of the present disclosure, whereby production costs of the bar-type display screen can be reduced and a technical problem of high production costs in the prior art can be solved.

Embodiment 2

Figure 5:
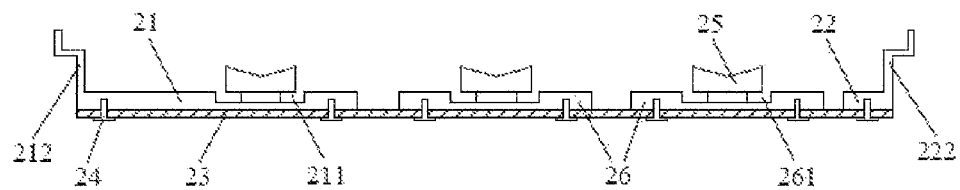
FIG. 5 schematically shows a cross-section view of a splicing backplane of a bar-type display screen according to Embodiment 2 of the present disclosure.
Figure 6:
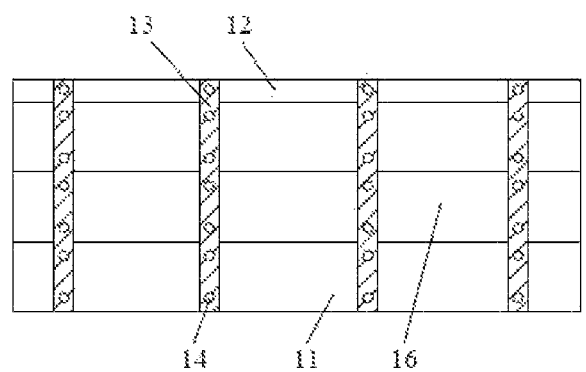
FIG. 6 schematically shows a plan view of the splicing backplane of the bar-type display screen according to Embodiment 2 of the present disclosure.

As shown in FIG. 5 and FIG. 6, a splicing backplane provided in an embodiment of the present disclosure includes a bottom frame 21, a top frame 22, and two independent blocks 26 that are spliced together. In addition, the bottom frame 21, the top frame 22, and the independent blocks 26 are fastened and connected using a connecting piece 23. In this embodiment, the bottom frame 21 and the top frame 22 are fastened to the connecting piece 23 using a screw 24, to ensure stability between the bottom frame 21, the top frame 22, and the connecting piece 23.

In addition, grooves 211 and 261 are disposed on the bottom frame 21 and the independent blocks 26. The grooves 211 and 261 may be configured to place a light bar 25, so as to provide a backlight source for a bar-type display screen. That is, the bottom frame 21 and the independent blocks 26 serve as a body part of the backplane and provide the backlight source. The top frame 22 has a relatively small size and is spliced with the bottom frame 21 only as a bezel of the backplane, to form the complete backplane. Quantity of the bottom frame 21 and the grooves 211 and 261 that are on the independent blocks 26 may also be increased according to a specific light source requirement.

Further, a supporting wall 212 is disposed at the bottom of the bottom frame 21, and a supporting wall 222 is also disposed on the top of the top frame 22. The supporting walls 212 and 222 disposed on the bottom frame 21 and the top frame 22 are configured as supporting walls on top and bottom sides of the whole backplane. The supporting walls 212 and 222 can protect the light bar inside the backplane and may also be configured to fasten and install a liquid crystal panel.

It can be seen from FIG. 5 and FIG. 6 that, the connecting piece 23 in this embodiment is of a bar type. In addition, in another embodiment, the connecting piece 23 may also be of a broken-line type, an arc type, or other types, as shown in FIG. 4.

According to this embodiment of the present disclosure, the splicing backplane of the bar-type display screen is obtained by splicing the bottom frame 21, the top frame 22, and the independent blocks 26. In addition, the bottom frame 21, the top frame 22, and the independent blocks 26 are fastened and connected using the connecting piece 23. The grooves 211 and 261 disposed on the bottom frame 21 and the independent blocks 26 may be configured to place the light bar 25, to provide the backlight source for the bar-type display screen. Compared with Embodiment 1, the splicing backplane provided in this embodiment is applicable to a bar-type display screen with a larger width. An appropriate quantity of independent blocks 26 may be additionally disposed between the bottom frame 21 and the top frame 22 according to the width of the bar-type display screen, so that the backplane of the bar-type display screen can be obtained by splicing and assembling the bottom frame 21, the top frame 22, and the independent blocks 26. In this way, production costs of the bar-type display screen can be reduced and a technical problem of high production costs in the prior art can be solved.

It should be noted that, although two independent blocks are applied to the splicing backplane in this embodiment, in another embodiment, one independent block may be applied according to an actual size of a bar-type display screen, or three or more independent blocks may be applied.

Embodiment 3

This embodiment of the present disclosure provides a bar-type display screen.

Figure 7:
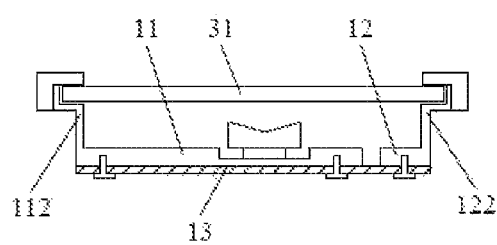
FIG. 7 schematically shows a cross-section view of a bar-type display screen according to Embodiment 3 of the present disclosure.

As shown in FIG. 7, in one embodiment, the bar-type display screen includes a liquid crystal panel and the splicing backplane provided in Embodiment 1. The splicing backplane is obtained by splicing and assembling the bottom frame 11 and the top frame 12 using the connecting piece 13. A liquid crystal panel 31 is fastened to the supporting walls 112 and 122 of the bottom frame 11 and the top frame 12.

Figure 8:
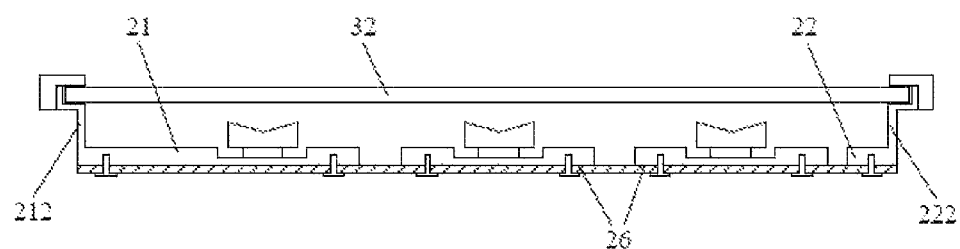
FIG. 8 schematically shows a cross-section view of another bar-type display screen according to Embodiment 3 of the present disclosure.

As shown in FIG. 8, in one embodiment, the bar-type display screen includes a liquid crystal panel and the splicing backplane provided in Embodiment 2. The splicing backplane is obtained by splicing and assembling the bottom frame 21, the top frame 22, and the independent blocks 26 using the connecting piece 23. The liquid crystal panel 32 is fastened to the supporting walls 212 and 222 of the bottom frame 21 and the top frame 22.

The bar-type display screen provided in this embodiment of the present disclosure has the same technical features as the splicing backplane provided in the foregoing embodiments, and therefore can solve the same technical problem and achieve the same technical effect.

Although the embodiments of the present disclosure are disclosed as above, the contents thereof are provided merely for a better understanding of the present disclosure instead of limiting the present disclosure. Persons skilled in the art of the present disclosure may make various modifications and variants to the implementation manners and details, without departing from the spirit and scope of the present disclosure. The scope of the present disclosure should be subject to the scope defined in the claims.

The invention claimed is:

1. A splicing backplane of a bar-type display screen, wherein the splicing backplane comprises a bottom frame and a top frame that are spliced together,
wherein the bottom frame and the top frame are fastened and connected using a connecting piece, and a groove configured to place a light bar is disposed on the bottom frame;
the splicing backplane further comprises one or more independent blocks that are disposed between the bottom frame and the top frame, and a groove configured to place a light bar is disposed on the independent block.

2. The splicing backplane according to claim 1, wherein the bottom frame and the top frame are fastened to the connecting piece using screws.

3. The splicing backplane according to claim 2, wherein the connecting piece is of a bar type, a broken-line type, or an arc type.

4. The splicing backplane according to claim 1, wherein a supporting wall is disposed at the bottom of the bottom frame.

5. The splicing backplane according to claim 4, wherein the connecting piece is of a bar type, a broken-line type, or an arc type.

6. The splicing backplane according to claim 1, wherein a supporting wall is disposed on the top of the top frame.

7. The splicing backplane according to claim 6, wherein the connecting piece is of a bar type, a broken-line type, or an arc type.

8. The splicing backplane according to claim 1, wherein the independent block is fastened and connected to the bottom frame and the top frame using the connecting piece.

9. The splicing backplane according to claim 8, wherein the independent block is fastened to the connecting piece using screws.

10. The splicing backplane according to claim 9, wherein the connecting piece is of a bar type, a broken-line type, or an arc type.

11. The splicing backplane according to claim 8, wherein the connecting piece is of a bar type, a broken-line type, or an arc type.

12. The splicing backplane according to claim 1, wherein the connecting piece is of a bar type, a broken-line type, or an arc type.

13. A bar-type display screen, comprising a liquid crystal panel and a splicing backplane, wherein the splicing backplane comprises a bottom frame and a top frame that are spliced together,
wherein the bottom frame and the top frame are fastened and connected using a connecting piece, and a groove configured to place a light bar is disposed on the bottom frame;
the splicing backplane further comprises one or more independent blocks that are disposed between the bottom frame and the top frame, and a groove configured to place a light bar is disposed on the independent block.

14. The bar-type display screen according to claim 13, wherein the liquid crystal panel is fastened to the bottom frame and the top frame.

15. The bar-type display screen according to claim 13, wherein the bottom frame and the top frame are fastened to the connecting piece using screws.

16. The bar-type display screen according to claim 13, wherein a supporting wall is disposed at the bottom of the bottom frame.

17. The bar-type display screen according to claim 13, wherein a supporting wall is disposed on the top of the top frame.

18. The bar-type display screen according to claim 13, wherein the independent block is fastened and connected to the bottom frame and the top frame using the connecting piece.

19. The bar-type display screen according to claim 18, wherein the independent block is fastened to the connecting piece using screws.

20. The bar-type display screen according to claim 13, wherein the connecting piece is of a bar type, a broken-line type, or an arc type.

\* \* \* \* \*